United States Patent [19]

Imataki et al.

[11] Patent Number: 4,925,733
[45] Date of Patent: May 15, 1990

[54] MAGNETIC RECORDING MEDIUM

[75] Inventors: Hiroyuki Imataki; Mizuho Hiraoka, both of Kawasaki, Japan

[73] Assignee: Canon Kabushiki Kaisha, Tokyo, Japan

[21] Appl. No.: 173,042

[22] Filed: Mar. 28, 1988

Related U.S. Application Data

[63] Continuation of Ser. No. 763,713, Aug. 8, 1985, abandoned.

[30] Foreign Application Priority Data

Aug. 18, 1984 [JP] Japan .................. 59-172239

[51] Int. Cl.⁵ ............................................. G11B 5/64
[52] U.S. Cl. ................... 428/336; 204/192.1; 427/34; 427/131; 428/422; 428/694; 428/900
[58] Field of Search ............. 428/422, 469, 694, 900, 428/336; 204/192.1, 192.2; 427/34, 35, 131

[56] References Cited

U.S. PATENT DOCUMENTS

| 4,307,156 | 12/1981 | Yanagisawa | 428/694 |
| 4,414,650 | 11/1983 | Ohta et al. | 365/122 |
| 4,495,242 | 1/1985 | Arai et al. | 428/695 |
| 4,551,778 | 11/1985 | Arai et al. | 428/695 |
| 4,565,734 | 1/1986 | Arai et al. | 428/694 |
| 4,582,746 | 4/1986 | Shirahata et al. | 428/694 |
| 4,583,145 | 4/1986 | Mönnich et al. | 428/694 |
| 4,599,266 | 7/1986 | Nakayama et al. | 428/694 |

FOREIGN PATENT DOCUMENTS 109784 8/1981 Japan .
19739 2/1983 Japan .
179939 10/1983 Japan .

Primary Examiner—Paul J. Thibodeau
Attorney, Agent, or Firm—Fitzpatrick, Cella, Harper & Scinto

[57] ABSTRACT

A magnetic recording medium with a recording layer composed of a magnetic film formed on a substrate, in which an intermediate layer and a plasma-polymerized film are formed in succession on the recording layer.

12 Claims, 2 Drawing Sheets

MAGNETIC RECORDING MEDIUM

This application is a continuation of application Ser. No. 763,713, filed Aug. 8, 1985, now abandoned.

BACKGROUND AND SUMMARY OF THE INVENTION

The present invention relates to a magnetic recording medium adapted for use in magnetooptical memory, magnetic recording, display device or the like, and more particularly to an improvement in a magnetooptical recording medium allowing regeneration of recorded information by means of magnetooptical effect such as magnetic Kerr effect or Faraday effect.

For use as the recording layer of magnetooptical recording medium, there have conventionally proposed polycrystalline films such as MnBi or MnCuBi, amorphous films such as GdCo, GdFe, TbFe, DyFe, GdTbFe, TbDyFe, GdFeCo, TbFeCo or GdtbCo, and single crystal films such as GdIG.

Among these films, the aforementioned amorphous films are recently considered most preferable for use as the recording layer of magnetooptical recording medium, in consideration of the film forming property at the formation of a film of a large area at a nearly ambient temperature, the recording efficiency for recording signals with a small optothermal energy, and the readout efficiency for regenerating the recorded signal with a high S/N ratio. Particulary GdTbFe is most preferred as the recording layer of the magnetooptical recording medium because of a large Kerr rotation angle and a Curie point in the range of 150° C.

However the amorphous magnetic materials employed in the magnetic recording medium, including GdTbFe, are generally associated with a drawback of poor anticorrosive resistance. Lack of reliable stability is the largest problem of these materials as they show deterioration in the magnetic properties when maintained in contact with air and water vapor and are eventually oxidized completely to transparent state.

In order to resolve the above-mentioned drawback it is necessary, in addition to the improvement in the magnetic material itself, to isolate the recording layer, consisting of such magnetic material, from air (particularly oxygen) and moisture which are the cause of said deterioration. Such isolation can be most conveniently achieved by covering the recording layer with a material of low permeation of air and moisture, and various materials have been proposed for use in such protective layer. Examples of such materials are oxides such as ZnO, MgO, $Al_2O_3$, SiO (disclosed in the Japanese Patent Laid-open No. 110056/1984), $SiO_2$, $ZrO_2$, $CeO_2$, $In_2O_3$, $SnO_2$, $TiO_2$, $LiNbO_3$ or $LiTaO_3$, fluorides such as $MgF_2$, $CaF_2$ or $CeF_4$, and nitrides such as $Si_3N_4$ or ALN (disclosed in the Japanese Patent Laid-open No. 110052/1984). Also known is the use of a coating, obtained with an appropriate solvent, of an organic resin such as polypropylene, polyethylene, polyamide, polyacrylonitrile, vinylidene chloride, polycarbonate, ethylene-vinyl acetate copolymer, vinyl chloride-vinyl acetate copolymer, vinylidene chloride-acrylonitrile copolymer etc., or of a plasma-polymerized film of fluorocarbon as disclosed in the Japanese Patent Laid-open No. 90246/1984.

Among these conventional protective films, inorganic ones consisting of oxides or fluorides are advantageous because of simple film formation by a dry process such as vacuum evaporation or sputtering, but are still deficient in the insulation of air and moisture, thus being unable to achieve satisfactory prevention of deterioration of the recording layer. On the other hand, the coating of organic resins not only requires a complex wet process involving the use of solvents, but also is associated with fluctuating properties of the obtained protective layer.

The plasma-polymerized film is ideal for the protective layer because it can be formed in a dry process and is little permeated by air and moisture. However, though such plasma-polymerized film can be satisfactorily formed under the recording layer as disclosed in said Japanese Patent Laid-open No. 90246/1984, formation of such film on the recording layer gives rise to a reaction between the monomer gas and the magnetic layer in the course of plasma polymerization process, often resulting in a deterioration of the magnetic properties.

The object of the present invention, therefore, is to provide a magnetic recording medium with a significantly improved anticorrosive resistance, without sacrificing the magnetic properties of the recording layer.

The above-mentioned object can be achieved according to the present invention by forming a plasma-polymerized film on a recording layer with an intermediate layer therebetween.

DESCRIPTION OF THE PREFERRED EMBODIMENTS

Figure 1:
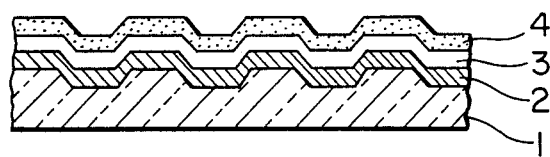
FIGS. 1 and 2 are schematic cross-sectional views showing embodiment of the magnetic recording medium of the present invention.

FIG. 1 is schematic cross-sectional view of an embodiment of the magnetic recording medium of the present invention, in which a substrate 1, composed for example of glass, may be provided with tracking guide grooves for signal recording and regeneration in the form of surface irregularity as illustrated. There is also provided a recording layer 2 composed of an amorphous magnetic film such as GdTbFe, TbFeCo or GdTbFeCo. On said recording layer 2 there are formed an intermediate layer 3 and a plasma-polymerized film 4. Said intermediate layer 3 is composed for example of $Al_2O_3$, BaO, BeO, $CeO_2$, $In_2O_3$, $SiO_2$, SiO, $SnO_2$, $Ta_2O_5$, $TiO_2$, $ThO_2$, $ZrO_2$, $MgF_2$, $CeF_4$, $LaF_3$ or a mixture thereof. Instead of such inorganic material there may also be employed an organic resin layer, but the aforementioned inorganic layer is preferable as it can be formed subsequent to the formation of the recording layer in a same vacuum chamber, without contact of the recording layer with air. The thickness of the intermediate layer 3, though variable depending on the material thereof, is preferably at least equal to 60 Å in order to protect the recording layer from the influence of monomer gas at the plasma polymerization. On the other hand, an excessively thick intermediate layer 3 may develop cracks because of the stress therein. Consequently the thickness of the intermediate layer is preferably in a range from 60 to 10,000 Å, more preferably from 60 to 5,000 Å.

The plasma-polymerized film 4 may be composed of any material, but is preferably composed of a strongly hydrophobic fluorinated monomer such as tetrafluoroethylene, hexafluoropropene, hexafluoro-2-butyne, hexafluoro-1,3-butadiene, hexafluorobenzene, octafluoro-2-butene, octafluorocyclobutane, chlorotrifluoroethylene, trifluoroethyne, hexafluoropropylene, vinyl fluoride or vinylidene fluoride, or a hydrocarbon monomer such as ethylene, acetylene, methane, styrene or benzene. Such monomers form a plasma-polymerized film by means of capacitative or inductive discharge. The plasma-polymerized film is preferably formed with a thickness of 50 Å to several thousand Å, since satisfactory moisture prevention cannot be expected with a thickness less than 50 Å.

Figure 2:
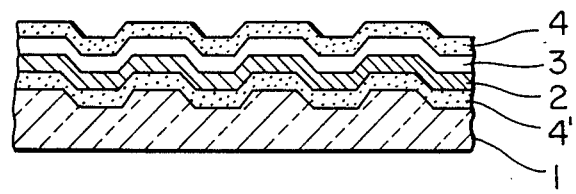

FIG. 2 shows another embodiment of the magnetic recording medium of the present invention, where in the same components as those in FIG. 1 are represented by same numbers and are omitted from the following description. In this embodiment the substrate 1 is at first provided with a plasma-polymerized film 4', on which formed in succession are a recording layer 2, an intermediate layer 3 and a plasma-polymerized film 4. Such structure is effective for preventing the deterioration of the recording layer particularly in case the substrate 1 is composed of a material showing large moisture permeation, such as polymethyl methacrylate (PMMA).

[EXAMPLE 1]

On a glass substrate, composed of a slide glass plate of 25 mm×75 mm×1.8 mm, there was formed an amorphous magnetic film of GdTbFeCo of a thickness of 1,500 Å as the recording layer in a high-frequency sputtering apparatus. On said recording layer there was formed an intermediate layer of SiO with a thickness of 3,000 Å by vacuum evaporation under electron beam heating. Then, on said intermediate layer there was formed a plasma-polymerized film of a thickness of 4,000 Å from tetrafluoroethylene monomer in the presence of a high-frequency voltage of 13.56 MHz applied across capacity-coupled parallel flat electrodes.

Figure 3:
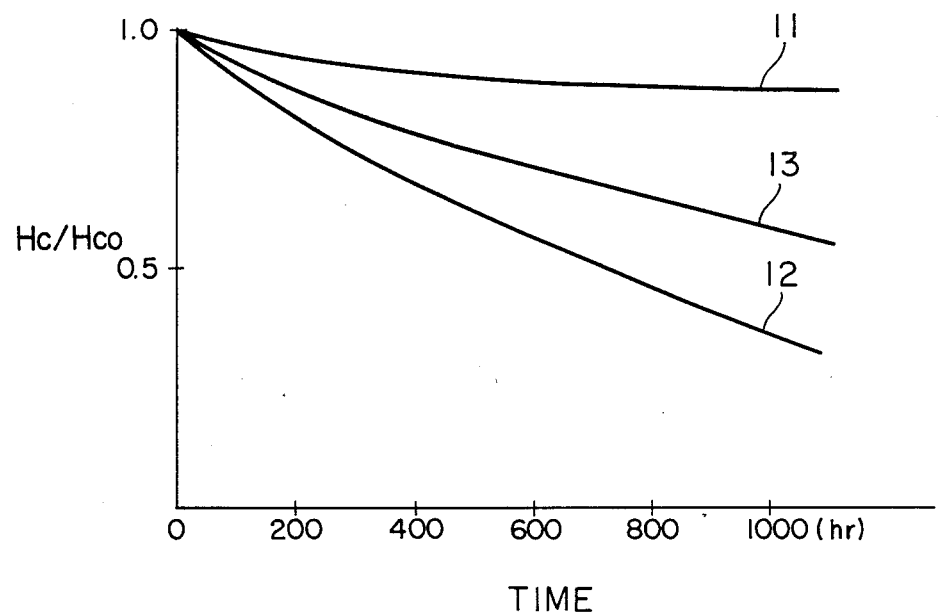
FIG. 3 is a chart showing the result of anticorrosion tests on the examples of the present invention.

The magnetic recording medium thus prepared was subjected to an anticorrosion test in a thermostatic chamber of 85° C. and 85% RH. The obtained result is represented by a curve 11 in FIG. 3, wherein the ordinate indicates the ratio Hc/HcO of the coercive force Hc to the initial value HcO thereof, while the abscissa indicates the period of test in hours. A larger loss in the coercive force indicates a larger degree of corrosion. In FIG. 3, curves 12 and 13 show the test results on reference examples. In the reference example represented by the curve 12, a plasma-polymerized film of a thickness of 4,000 Å was formed, without the intermediate layer, directly on the recording layer same as in the Example 1. On the other hand, in the reference example represented by the curve 13, an SiO film of a thickness of 3,000 Å alone was formed, without the plasma-polymerized film, on the recording layer same as in the Example 1.

As will be apparent from FIG. 3, a highest anticorrosion resistance was obtained in a magnetic recording medium which was provided with a plasma-polymerized film on an intermediate layer.

[EXAMPLE 2]

Various intermediate layers and plasma-polymerized films were formed on a recording layer same as in the Example 1 in order to compare the protective effect. Tab. 1 summarizes the changes in the coercive force (ratio Hc/HcO) of these magnetic recording media after an anticorrosion test for 1,000 hours at 85° C. and 85% RH.

TABLE 1

| Intermediate layer | | Plasma-polymerized film | | Hc/Hco |
|---|---|---|---|---|
| Material | Thickness | Monomer | Thickness | (1000 hr) |
| SiO | 1000Å | Tetrafluoroethylene | 4000Å | 0.90 |
| MgF$_2$ | 1000Å | Tetrafluoroethylene | 4000Å | 0.83 |
| CeO$_2$ | 1000Å | Tetrafluoroethylene | 4000Å | 0.87 |
| ZrO$_2$ | 1000Å | Tetrafluoroethylene | 4000Å | 0.92 |
| ZrO$_2$ | 2µ | Tetrafluoroethylene | 4000Å | 0.85 |
| SiO | 1000Å | Hexafluoropropylene | 4000Å | 0.84 |
| SiO | 1000Å | Styrene | 4000Å | 0.82 |
| SiO | 1000Å | Ethylene | 4000Å | 0.89 |
| SiO | 1000Å | Dimethyldimethoxysilane | 4000Å | 0.80 |

As will be apparent from the foregoing table, these examples show superior anticorrosion resistance to the aforementioned reference examples.

As example in the foregoing, the present invention allows to significantly improve the anticorrosion resistance of a conventional magnetic recording medium without sacrificing the magnetic properties of the recording layer thereof, by forming a plasma-polymerized film on an intermediate layer formed on said recording layer.

The foregoing examples have been limited to cases where the recording layer is composed of an amorphous magnetic film. Though the effect is particularly marked in such cases, the present invention is applicable also to the cases where the recording layer is composed of other magnetic films.

What we claim is:

1. A magnetic recording medium, comprising:
   a substrate;
   a recording layer composed of a magnetic film formed on said substrate;
   an intermediate layer for protecting said magnetic film from monomer gas during plasma polymerization, said intermediate layer formed over said recording layer by either vacuum evaporation or sputtering and being composed of Al$_2$O$_3$, BaO, BeO, CeO$_2$, In$_2$O$_3$, SiO$_2$, SiO, SnO$_2$, Ta$_2$O$_5$, TiO$_2$, ThO$_2$, ZrO$_2$, MgF$_2$, CeF$_4$, LaF$_3$ or a mixture of two or more of the foregoing compounds; and
   an anticorrosive layer formed on said intermediate layer by plasma-polymerization.

2. A magnetic recording medium according to claim 1, wherein said intermediate layer has a thickness in a range from 60 to 10,000 Å.

3. A magnetic recording medium according to claim 2, wherein said intermediate layer has a thickness less than approximately 5,000 Å.

4. A magnetic recording medium according to claim 1, wherein said anticorrosive layer film is formed from a fluorinated monomer.

5. A magnetic recording medium according to claim 4, wherein said anticorrosive layer film is formed from tetrafluoroethylene, hexafluoropropene, hexafluoro-2-butyne, hexafluoro-1,3-butadiene, hexafluorobenzene, octafluoro-2-butene, octafluorocyclobutane, chlorotrifluoroethylene, trifluoroethyne, hexafluoropropylene, vinyl fluoride or vinylidene fluoride.

6. A magnetic recording medium according to claim 1, wherein said anticorrosive layer film is formed from a hydrocarbon monomer.

7. A magnetic recording medium according to claim 6, wherein said anticorrosive layer film is formed from ethylene, acetylene, methane, styrene or benzene.

8. A magnetic recording medium according to claim 1, wherein said anticorrosive layer film has a thickness in a range form 50 Å to 4000 Å.

9. A magnetic recording medium according to claim 1, further comprising a second said anticorrosive layer film formed between said substrate and said magnetic film.

10. A magnetic recording medium according to claim 9, wherein said substrate is composed of polymethyl methacrylate (PMMA).

11. A magnetic recording medium according to claim 1, wherein said anticorrosive layer film is formed from a monomer by capacitative or inductive discharge.

12. A magnetic recording medium according to claim 1, wherein said recording layer is composed of an amorphous magnetic film.

* * * * *

UNITED STATES PATENT AND TRADEMARK OFFICE
CERTIFICATE OF CORRECTION

PATENT NO. : 4,925,733
DATED : May 15, 1990
INVENTOR(S) : HIROYUKI IMATAKI ET AL.   Page 1 of 2

It is certified that error appears in the above-identified patent and that said Letters Patent is hereby corrected as shown below:

COLUMN 4

Line 53, "anticorrosive layer" should read --anticorrosive layer film--.
    Line 62, "anticorrosive layer film" should read --anticorrosive layer--.
    Line 65, "anticorrosive layer film" should read --anticorrosive layer--.

COLUMN 5

Line 4, "anticorrosive layer film" should read --anticorrosive layer--.
    Line 7, "anticorrosive layer film" should read --anticorrosive layer--.
    Line 10, "anticorrosive layer film" should read --anticorrosive layer--.

UNITED STATES PATENT AND TRADEMARK OFFICE
CERTIFICATE OF CORRECTION

PATENT NO. : 4,925,733

DATED : May 15, 1990

INVENTOR(S) : HIROYUKI IMATAKI ET AL.     Page 2 of 2

It is certified that error appears in the above-identified patent and that said Letters Patent is hereby corrected as shown below:

COLUMN 6

Line 1, "film" should be deleted.
Line 7, "anticorrosive layer film" should read
--anticorrosive layer--.

Signed and Sealed this

Thirty-first Day of December, 1991

Attest:

HARRY F. MANBECK, JR.

Attesting Officer        Commissioner of Patents and Trademarks